United States Patent [19]

Boeger

[11] Patent Number: 4,768,423

[45] Date of Patent: Sep. 6, 1988

[54] VEHICLE CHARCOAL AIR FILTER ASSEMBLY

[76] Inventor: Glen D. Boeger, 1925 W. Cross Street Rd., Anderson, Ind. 46012

[21] Appl. No.: 56,890

[22] Filed: Jun. 3, 1987

[51] Int. Cl.$^4$ .............................................. B60H 3/06
[52] U.S. Cl. ........................................ 98/2.11; 98/2.16
[58] Field of Search ....................... 98/2.11, 2.16, 2.17

[56] References Cited

U.S. PATENT DOCUMENTS

| | | | |
|---|---|---|---|
| 2,213,017 | 8/1940 | Perkins | 98/2.11 |
| 3,870,495 | 3/1975 | Dixson et al. | 98/2.11 X |
| 3,941,034 | 3/1976 | Helwig et al. | 98/2.11 |
| 4,242,951 | 1/1981 | Bemiss | 98/2.11 |
| 4,648,311 | 3/1987 | Slosiarek et al. | 98/2.11 |

FOREIGN PATENT DOCUMENTS

| | | | |
|---|---|---|---|
| 2140452 | 2/1973 | Fed. Rep. of Germany | 98/2.11 |
| 2813662 | 10/1976 | Fed. Rep. of Germany | 98/2.11 |

Primary Examiner—Harold Joyce
Attorney, Agent, or Firm—Richard C. Litman

[57] ABSTRACT

An improved air filtering device for use with motor vehicles includes a carbon bed filter removably mountable within the vehicle cowl air inlet adjacent the bottom of the vehicle windshield. Provision is made for quickly securing the replaceable filter pack in numerous forms of cowl inlets.

2 Claims, 2 Drawing Sheets

VEHICLE CHARCOAL AIR FILTER ASSEMBLY

BACKGROUND OF THE INVENTION

In the present world of mass transportation and attendant pollution the need exists to provide extra precautionary means to insure that the air to which one is exposed is as close to pure air as can be, even when driving in an automobile.

This invention relates to an improved easily replaceable air filter assembly as applied to the air intake of a vehicle body, and more particularly, the invention is directed to an improved manner of filtering ambient air that is directed into the interior, passenger compartment of a motor vehicle through its air conditioning, heating, and ventilation systems and includes a carbon bed filter with attachment devices allowing removable mounting of the filter assembly over the outside air inlet of a vehicle's singular air duct system as provided for its air conditioning, heating and ventilation.

DESCRIPTION OF THE PRIOR ART

Various prior art air filtering devices and more particularly automobile air filtering devices and the like, as well as the apparatus and method of their construction in general, are known and are found to be exemplary of the U.S. prior art. They are:

| U.S. Pat. No. | Inventor |
| --- | --- |
| 2,161,728 | W. B. Stout |
| 2,342,872 | A. W. Le Fevre Et. Al |
| 2,445,392 | H. J. Findley |
| 2,614,654 | K. I. Striden |

U.S. Pat. No. 2,161,728 discloses a ventilator which relates particularly to a front end construction for automobiles with means for providing ventilation to the interior. A filter screen for particles is included in the venting system. U.S. Pat. No. 2,342,872 discloses an improved automobile heater with the object of increasing the supply of fresh air to the interior compartment of the vehicle and which provides control and regulation of the incoming air. A scoop is located behind the radiator to receive the air stream developed by the engine fan. U.S. Pat. No. 2,445,392 discloses a heating and ventilating apparatus for vehicles comprising an air heater and blower located in that part of the engine compartment which can supply relatively large volumes of air to the interior compartment. And, U.S. Pat. No. 2,614,654 discloses an automotive air filter attachment with means to filter the outside air entering the interior of the vehicle and includes a layer of filtering material located between two screens inside the air intake ducts to filter air to the vents.

These patents or known prior uses teach and disclose various types of air filtering devices and more particularly automobile air filtering devices. However, none of them, whether taken singly or in combination, discloses an air filtering device where the air intake is placed at the base of the windshield area and a singular air duct system is used for air conditioning, heating and ventilation by means of a common blower, in such a way as to bear upon the claims of the present invention.

SUMMARY OF THE INVENTION

It is an object of this invention to provide an improved automobile air filter device that can be easily adapted for use in new as well as earlier model vehicles.

Another object of this invention is to provide an improved device for incoming air to a vehicle passenger compartment to neutralize up to 95% of odors or gases and which is effective even in the filtering of carbon monoxide gas.

Another object of this invention is to provide an improved filter device for air mountable in the aerodynamically most advantageous area at the base of the windshield.

These, together with other objects and advantages of the invention reside in the details of the process and the operation thereof, as is more fully hereinafter described and claimed. References are made to drawings forming a part thereof, wherein like numerals refer to like parts throughout.

DESCRIPTION OF THE PREFERRED EMBODIMENT

Figure 1:
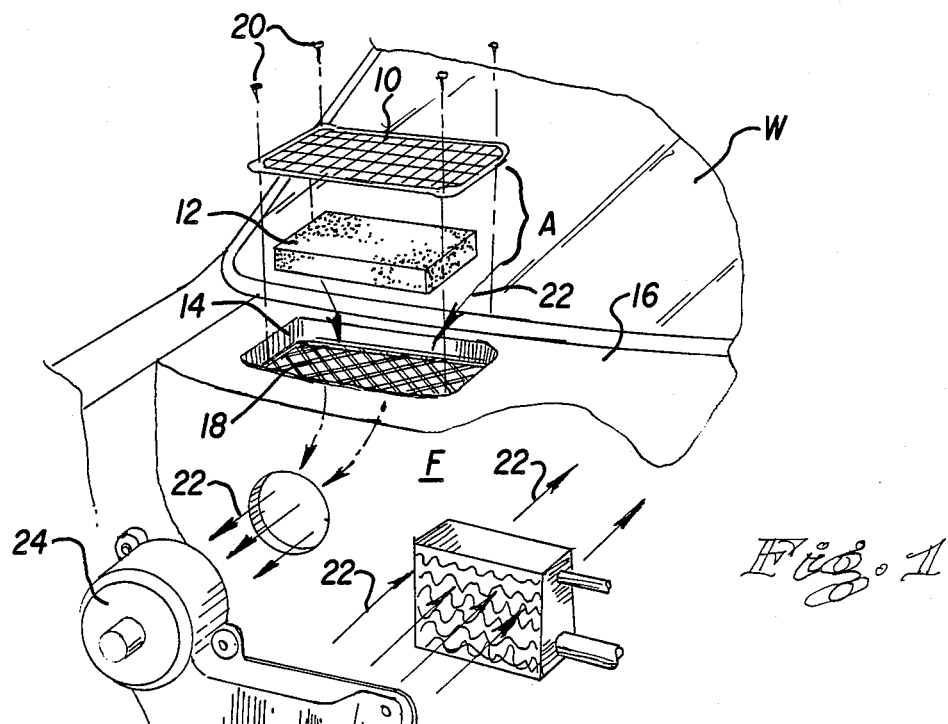
FIG. 1 is a top perspective, exploded view of a carbon bed filter and screen cover according to the present invention.

Referring now to the drawings there is shown in FIG. 1 a packed carbon bed filter 12 and a leaf screen cover 10 for mounting and protecting the filter. The filter bed 12 preferably comprises a one-inch thick carbon pack which has been found to be up to 95% efficient in the filtering of odors and gases, including carbon monoxide gas, which is one of the major problems of respiratory air inside the passenger compartment of a motor vehicle. The length and width of the carbon filter and screen is dependent on the type of vehicle in which it will be installed and various adaptations are presented herein, each allowing ready installation and/or replacement, even by the average vehicle owner.

The filter pack 12 and screen 10 are configured to substantially overlie an existing air inlet 14 as provided through the top cowl member 16 as formed adjacent to the windshield W and firewall area F of a vehicle. In the installation of FIG. 1, the filter assembly may be mounted atop the existing leaf screen 18, and retained by suitable fasteners 20 carried by the filter screen 10 and secured either to the perimeter of the cowl screen 18 or the cowl member 16 whereby the carbon filter bed 12 will be fixedly sandwiched an operative position adapted to receive all air as drawn into the vehicle interior through the inlet 14.

FIG. 1 depicts a typical vehicle arrangement wherein it will be seen that ambient air as drawn into the vehicle passenger compartment initially passes through the filter assembly A as reflected by the arrows 22. Whether or not the vehicle is moving, whenever the blower 24 is operating, a positive flow of air 22 will be directed into the vehicle's interior through the existing plenum and ducts as is well known. It will be appreciated that with certain vehicles, even when the blower is not operated, the ram effect produced by the moving vehicle will allow the outside air to be directed through the air inlet 14.

Figure 2:
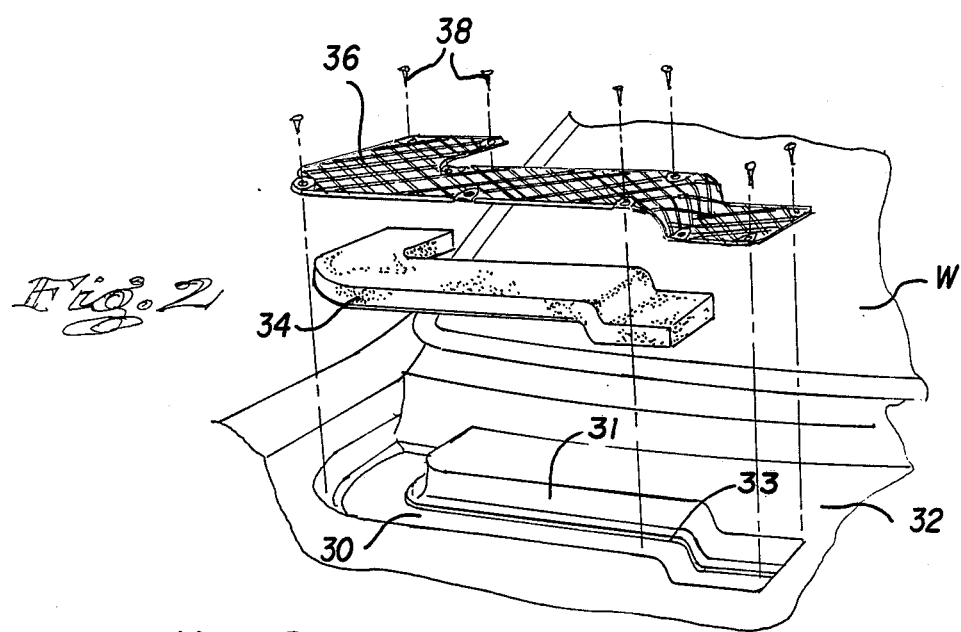
FIG. 2 is a top perspective view of an alternative installation.

An alternative vehicle arrangement is shown in FIG. 2 wherein the air inlet 30 extends substantially the length of the cowl member 32. In this instance a carbon bed filter pack 34 is shaped to conform to the inlet opening 30 and is retained upon a peripheral flange or shoulder 33 defining the lower limits of a depressed area or cavity 31 and protected beneath the existing screen and seal member 36, the latter of which may be secured by removable fasteners 38 or integral snap-fitting members (not shown). Alternatively, the filter pack 34 may utilize a screen as in the embodiment of FIG. 1.

Figure 2A:
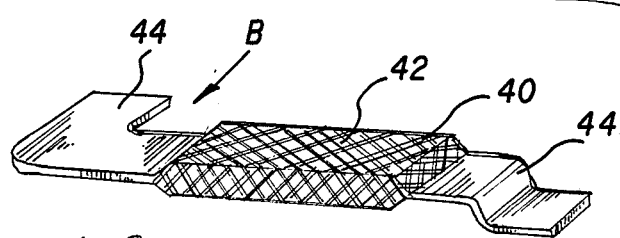
FIG. 2A is a top perspective view of an alternate filter assembly.

An integral preformed inlet filter top assembly B may be utilized as in FIG. 2A and which includes a carbon bed pack 40 with an attached screen element 42 and an integral imperforate molding section 44 at one or both ends. In this manner, the entire filter assembly is snap-fitted or otherwise mounted as a one-piece unit over a vehicle cowl opening.

Figure 3:
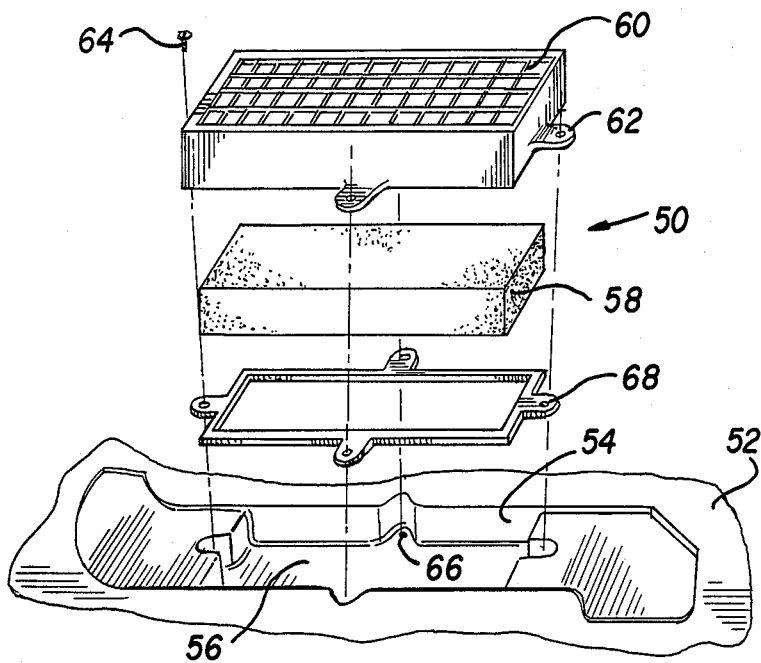
FIGS. 3 and 4 are exploded views of still further embodiments.

The vehicle cowl member may be originally constructed to accommodate a specific filter assembly 50 as shown in FIG. 3 wherein the cowl member 52 is formed with a recess or countersunk area 54 encompassing the air inlet 56 and adapted to receive, in a nested manner, the filter assembly 50. This assembly will include a carbon bed filter pack 58 retained within a screen frame 60, the latter having peripheral mounting tabs 62 receiving suitable fasteners 64 alignable with fastener receiving elements 66 about the periphery of the recess 54. An appropriate gasket 68 may be interposed between the filter assembly 50 and cowl recess 54 to insure no unfiltered air is drawn into the plenum beneath the cowl member 52.

Figure 4:
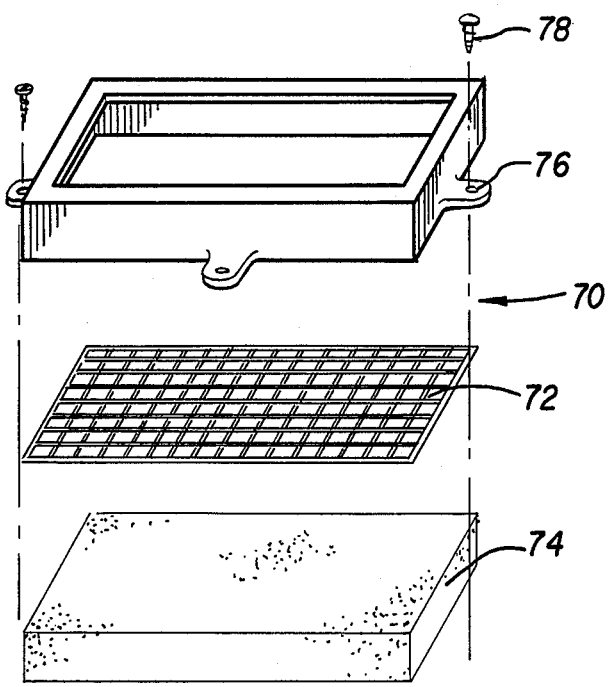

Instead of employing the screen itself to retain the filter pack in its mounted position as shown in FIGS. 1 and 3, a bezel 70 may be provided as shown in FIG. 4, to captively secure the screen 72 and carbon bed filter 74. Lugs 76 on the periphery receive suitable fasteners 78 for anchoring the assembled filter in place.

From the above it will be seen that a unique air filter assembly is provided wherein a carbon bed filter element is readily assembled within the path of air flow through the cowl inlet of a motor vehicle and wherein this assembly is adaptable for air inlets of various configurations. In any embodiment, the porous filter pack is easily replaced should it become clogged with dirt or the effectiveness of the carbon become diminished.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. In an air filter assembly for a motor vehicle having a substantially horizontally disposed cowl member provided with an air inlet opening therethrough, the improvement wherein;

said cowl member includes a depressed area having a lowermost inturned peripheral shoulder defining said air inlet opening, a preformed inlet filter top assembly removably insertable within said depressed area and supportable upon said peripheral shoulder, said filter top assembly defining a peripheral configuration mating with that of said depressed area, said filter top assembly including a carbon bed filter pack, a screen element enveloped about said filter pack, imperforate sections extending from opposite ends of said screen-enveloped filter pack, whereby said filter pack, screen element and imperforate sections comprises an integral assembly removably insertable within said depressed area as a single unit.

2. An air filter assembly as described in claim 1, wherein said air inlet extends substantially the width of said vehicle cowl member.

* * * * *